US012717694B2

(12) United States Patent
Kurabayashi

(10) Patent No.: US 12,717,694 B2
(45) Date of Patent: Aug. 25, 2026

(54) PROGRAM, SERVER, SYSTEM, AND DATA PROCESSING METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 246 days.

(21) Appl. No.: 18/604,337

(22) Filed: Mar. 13, 2024

(65) Prior Publication Data

US 2024/0232044 A1 Jul. 11, 2024

Related U.S. Application Data

(63) Continuation of application No. PCT/JP2022/034375, filed on Sep. 14, 2022.

(30) Foreign Application Priority Data

Sep. 14, 2021 (JP) ................................ 2021-149082

(51) Int. Cl.
*G06F 11/34* (2006.01)

(52) U.S. Cl.
CPC ...... *G06F 11/3476* (2013.01); *G06F 11/3452* (2013.01)

(58) Field of Classification Search
CPC ........................ G06F 11/3476; G06F 11/3452
See application file for complete search history.

(56) References Cited

U.S. PATENT DOCUMENTS 11,099,729 B1 * 8/2021 Ho ...................... G06F 3/04845
2012/0290971 A1 * 11/2012 Takami ................ G06F 16/957 715/784
2023/0319348 A1 * 10/2023 Sidhu .............. H04N 21/44213 725/9

FOREIGN PATENT DOCUMENTS

JP 5851065 B1 2/2016
JP 2018-136845 A 8/2018

OTHER PUBLICATIONS

Daniel Tovarnak et al., Normalization of Unstructured Log Data into Streams of Structured Event Objects, Apr. 1, 2019, Symposium on Integrated Network and Service Management, pp. 671-676 (Year: 2019).*

(Continued)

*Primary Examiner* — Tam T Tran
(74) *Attorney, Agent, or Firm* — Osha Bergman Watanabe & Burton LLP

(57) ABSTRACT

A program may include the following units within a user terminal: a display control unit that displays content on a display and that switches the content displayed on the display by moving the displayed part either in a first direction or a second direction according to a user operation; a recording unit that records display position information together with a timestamp in log data; a normalization unit that performs normalization processing on the log data, in which the time elapsed since the start of viewing, indicated by the log data, is normalized by the total time of displaying the content on the display and viewing the content, and in which the display position information indicated by the log data is normalized by total length information of the content; and a transmission unit that transmits the log data subjected to the normalization processing to an external device.

10 Claims, 16 Drawing Sheets

(56) References Cited

OTHER PUBLICATIONS

Maayan Goldstein et al., Experience Report: Log-based Behavioral Differencing, Oct. 1, 2017, IEEE International Symposium on Software Reliability Engineering, pp. 282-293 (Year: 2017).*

International Search Report issued in PCT/JP2022/034375 on Nov. 8, 2022 (2 pages).

Written Opinion of the International Searching Authority issued in PCT/JP2022/034375 on Nov. 8, 2022 (3 pages).

* cited by examiner

CONTENT
W
TOTAL LENGTH OF CONTENT
LENGTHWISE DIRECTION OF CONTENT

FIG.6

LOG DATA

- CONTENT IDENTIFICATION INFORMATION : C0017281
- DISPLAY POSITION INFORMATION — DISPLAYED PART INFORMATION — TIMESTAMP

| | | |
|---|---|---|
| $d_1$ | $L_1$ | $T_1$ |
| $d_1$ | $L_1$ | $T_2$ |
| $d_2$ | $L_1$ | $T_3$ |
| $d_3$ | $L_1$ | $T_4$ |
| ⋮ | ⋮ | ⋮ |

FIG.7

NORMALIZED LOG DATA

- CONTENT IDENTIFICATION INFORMATION : C0017281
- DISPLAY POSITION INFORMATION — DISPLAYED PART INFORMATION — TIME ELAPSED

| DISPLAY POSITION INFORMATION | DISPLAYED PART INFORMATION | TIME ELAPSED |
|---|---|---|
| $d_1'$ | $L_1'$ | $T_1'$ |
| $d_1'$ | $L_1'$ | $T_2'$ |
| $d_2'$ | $L_1'$ | $T_3'$ |
| $d_3'$ | $L_1'$ | $T_4'$ |
| ⋮ | ⋮ | ⋮ |

INPUT/OUTPUT INTERFACE
3A
5A
PROCESSOR
MEMORY
PERIPHERAL CIRCUIT
1A
2A
4A

PROGRAM, SERVER, SYSTEM, AND DATA PROCESSING METHOD

TECHNICAL FIELD

The present invention relates to programs, servers, systems, and data processing methods.

BACKGROUND

Patent Literature 1 discloses a method of calculating the degree of interest of each user in one or more items of manga viewed by that user and determining optimal content that the user is to be notified about on the basis of the calculated degree of interest. As a means for calculating the degree of interest in each item of manga, Patent Literature 1 discloses adding/subtracting points in accordance with the viewing status, such as finished reading the story, not yet finished, or not yet started, and calculating the degree of interest in each item of manga on the basis of the calculated points.

CITATION LIST

Patent Literature

[PTL 1]
Publication of Japanese Patent No. 5851065

SUMMARY

Technical Problem

With the technology disclosed in Patent Literature 1, actions of users, such as finished reading, not yet finished, and not yet started, are detected at a granularity corresponding to each episode of content. However, it is hoped to detect user actions on each item of content at a finer granularity.

It is an object of one or more embodiments of the present invention to detect user actions on each item of content at a finer granularity compared with existing technologies.

Solution to Problem

Embodiments of the present invention provide a program for causing a computer to function as:

- a display control means for displaying a part of content on a display and switching the part of content displayed on the display by moving the displayed part either in a first direction or a second direction according to a user operation;
- a recording means for recording display position information together with a timestamp in log data, the display position information indicating the part of content displayed on the display;
- a normalization means for performing normalization processing on the log data, in which the time elapsed since the start of viewing, indicated by the log data, is normalized by the total time of displaying the content on the display and viewing the content, and in which the display position information indicated by the log data is normalized by total length information of the content; and
- a transmission means for transmitting the log data subjected to the normalization processing to an external device.

Furthermore, embodiments of the present invention provide a server including:

- a reception unit that receives log data subjected to normalization processing from a user terminal including a display control unit that displays a part of content on a display and that switches the part of content displayed on the display by moving the displayed part either in a first direction or a second direction according to a user operation, a recording unit that records display position information together with a timestamp in the log data, the display position information indicating the part of content displayed on the display, a normalization unit that performs the normalization processing on the log data, in which the time elapsed since the start of viewing, indicated by the log data, is normalized by the total time of displaying the content on the display and viewing the content, and in which the display position information indicated by the log data is normalized by total length information of the content, and a transmission unit that transmits the log data subjected to the normalization processing to an external device; and
- a computation unit that executes computational processing on the log data subjected to the normalization processing and received from the user terminal.

Furthermore, the present invention provides a system including: a plurality of user terminals having installed the program therein; and the server.

Furthermore, embodiments of the present invention provide a data processing method, wherein a computer executes:

- a display control step of displaying a part of content on a display and switching the part of content displayed on the display by moving the displayed part either in a first direction or a second direction according to a user operation;
- a recording step of recording display position information together with a timestamp in log data, the display position information indicating the part of content displayed on the display;
- a normalization step of performing normalization processing on the log data, in which the time elapsed since the start of viewing, indicated by the log data, is normalized by the total time of displaying the content on the display and viewing the content, and in which the display position information indicated by the log data is normalized by total length information of the content; and
- a transmission step of transmitting the log data subjected to the normalization processing to an external device.

Furthermore, the present invention provides a data processing method, wherein a computer executes:

- a reception step of receiving log data subjected to normalization processing from a user terminal including a display control unit that displays a part of content on a display and that switches the part of content displayed on the display by moving the displayed part either in a first direction or a second direction according to a user operation, a recording unit that records display position information together with a timestamp in the log data, the display position information indicating the part of content displayed on the display, a normalization unit that performs the normalization processing on the log data, in which the time elapsed since the start of viewing, indicated by the log data, is normalized by the total time of displaying the content on the display and viewing the content, and in which the display position information indicated by the log data is normalized by total length information of the content, and a transmission unit that transmits the log data subjected to the normalization processing to an external device; and a computation step of executing computational processing on the log data subjected to the normalization processing and received from the user terminal.

Furthermore, embodiments of the present invention provide a program for causing a computer to function as:

a reception means for receiving log data subjected to normalization processing from a user terminal including a display control unit that displays a part of content on a display and that switches the part of content displayed on the display by moving the displayed part either in a first direction or a second direction according to a user operation, a recording unit that records display position information together with a timestamp in the log data, the display position information indicating the part of content displayed on the display, a normalization unit that performs the normalization processing on the log data, in which the time elapsed since the start of viewing, indicated by the log data, is normalized by the total time of displaying the content on the display and viewing the content, and in which the display position information indicated by the log data is normalized by total length information of the content, and a transmission unit that transmits the log data subjected to the normalization processing to an external device; and a computation means for executing computational processing on the log data subjected to the normalization processing and received from the user terminal.

Advantageous Effects of Invention

The present invention makes it possible to detect user actions on each item of content at a finer granularity compared with existing technologies.

BRIEF DESCRIPTION OF DRAWINGS

FIG. 6 schematically shows an example of information that is processed by the system in this embodiment.

FIG. 7 schematically shows an example of information that is processed by the system in this embodiment.

DETAILED DESCRIPTION

Figure 1:
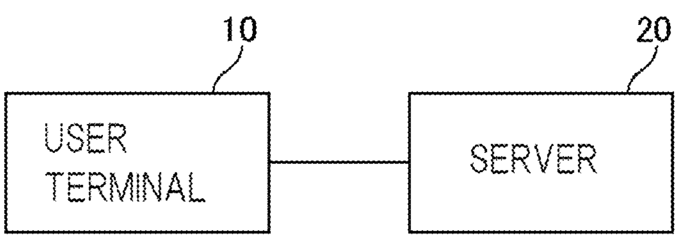
FIG. 1 shows an example functional block diagram of a system in this embodiment.

An embodiment of the present invention will be described below with reference to the drawings. Note that the same reference signs are added to the same constituent elements throughout the drawings, and descriptions will be omitted as appropriate.

<Overview>

With the technology in this invention, which position of content each user is viewing, as well as how long the user is viewing the content, are measured without having to use any external measurement instrument such as an eye tracker. Furthermore, with the technology in this embodiment, the results of the measurement mentioned above are normalized while considering the viewing speeds, which vary among individual users, the content lengths, which vary among individual items of content, the sizes of parts of the content displayed on displays, which vary depending on device characteristics and the manners of viewing by the users, etc., which makes it possible to compare measurement results among a plurality of items of content, to collectively analyze measurement results associated with a plurality of users, etc.

In this embodiment, what is processed is content that is viewed while the position of displaying the content on a display is moved in prescribed directions (a direction of advancing the story and a direction of rewinding the story) according to user operations, like vertical scrolling manga. This embodiment relates to a technology for calculating a key performance indicator (KPI) concerning actions of users who view content, at a finer granularity compared with existing technologies.

Existing KPIs are, for example, KPIs per episode of content, and are merely extensions of KPIs for e-commerce. In this embodiment, which part of content (e.g., a manga episode) is displayed on a display, as well as how long that part of content is displayed, until each user finishes reading the content are measured through software processing, and are visualized and subjected to statistical processing.

Here, vertical scrolling manga is like a single image with which the section that is displayed can be scrolled seamlessly in the vertical direction. It is possible to track the scrolling status of vertical scrolling manga with high accuracy via a terminal on which the vertical scrolling manga is displayed. According to this embodiment, a user's actions for viewing vertical scrolling manga are converted into a model normalized as "a temporal recording of upward and downward movements of the position displayed on a display in an image elongated in the vertical direction". This makes it possible to express the user's viewing actions in the form of a normalized byte array of, for example, about 400 KB (four-byte unsigned integer×100,000).

The results of measurement are normalized while considering the viewing speeds, which vary among individual users, the content lengths, which vary among individual items of content, the sizes of parts of the content displayed on displays, which vary depending on device characteristics and the manners of viewing by the users, etc., which makes it possible to perform various kinds of statistical processing and visualization processing.

As an example of statistical processing, "a viewing score" is calculated for each specific pixel, each frame constituted of a set of pixels, or each character in the frame such that the viewing score becomes higher as the corresponding pixel or pixels are displayed in a place nearer to the center of the window. Furthermore, it is possible to visualize the results of calculation on the content in the form of a heat map. In addition, it is possible to provide KPIs having fine granularities that have not hitherto been available, such as detecting sections where users tend to leave (that users tend to quit reading in the middle), detecting sections in which users tend to spend substantial time for reading, and detecting sections that users tend to skip in reading.

"Overall System Configuration"

As shown in FIG. 1, a system 1 includes a user terminal 10 and a server 20. The user terminal 10 and the server 20 are configured to be able to communicate with each other via a communication network such as the Internet.

The user terminal 10 is a terminal that is operated by a user who views content. Examples of the user terminal 10 include, but are not limited to, a smartphone, a tablet, a personal computer, a mobile phone, a smart watch, and a TV set having a feature of connecting to the Internet.

The server 20 has the function for acquiring data indicating user operations on content, detected at each user terminal 10, and for analyzing the data.

"Functional Configurations"

Next, the individual functional configurations of the user terminal 10 and the server 20 will be described.

<User Terminal 10>

Figure 2:
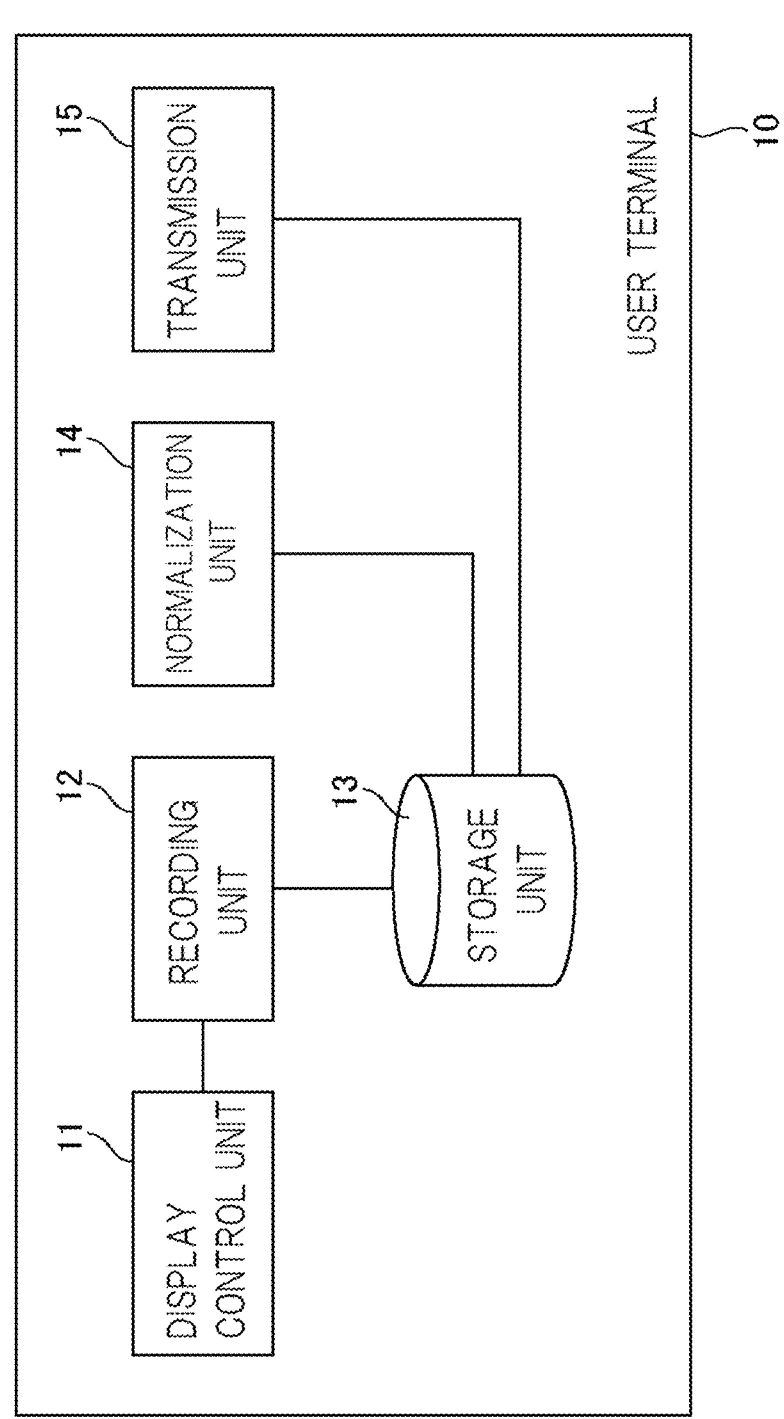
FIG. 2 shows an example functional block diagram of a user terminal in this embodiment.

FIG. 2 shows an example functional block diagram of the user terminal 10. As shown in the figure, the user terminal 10 includes a display control unit 11, a recording unit 12, a storage unit 13, a normalization unit 14, and a transmission unit 15. These functional units are realized by installing a prescribed application (program) in the user terminal 10.

The display control unit 11 displays a part of content on a display and switches the part of content displayed on the display by moving the displayed part either in a first direction or a second direction according to user operations.

The content is digital content that is displayed for viewing on a display of a terminal. In this embodiment, it is assumed that the content is vertical scrolling manga. For example, the content in this embodiment is an episode of vertical scrolling manga or a book of vertical scrolling manga. Example modifications of content will be described later.

Figure 3:
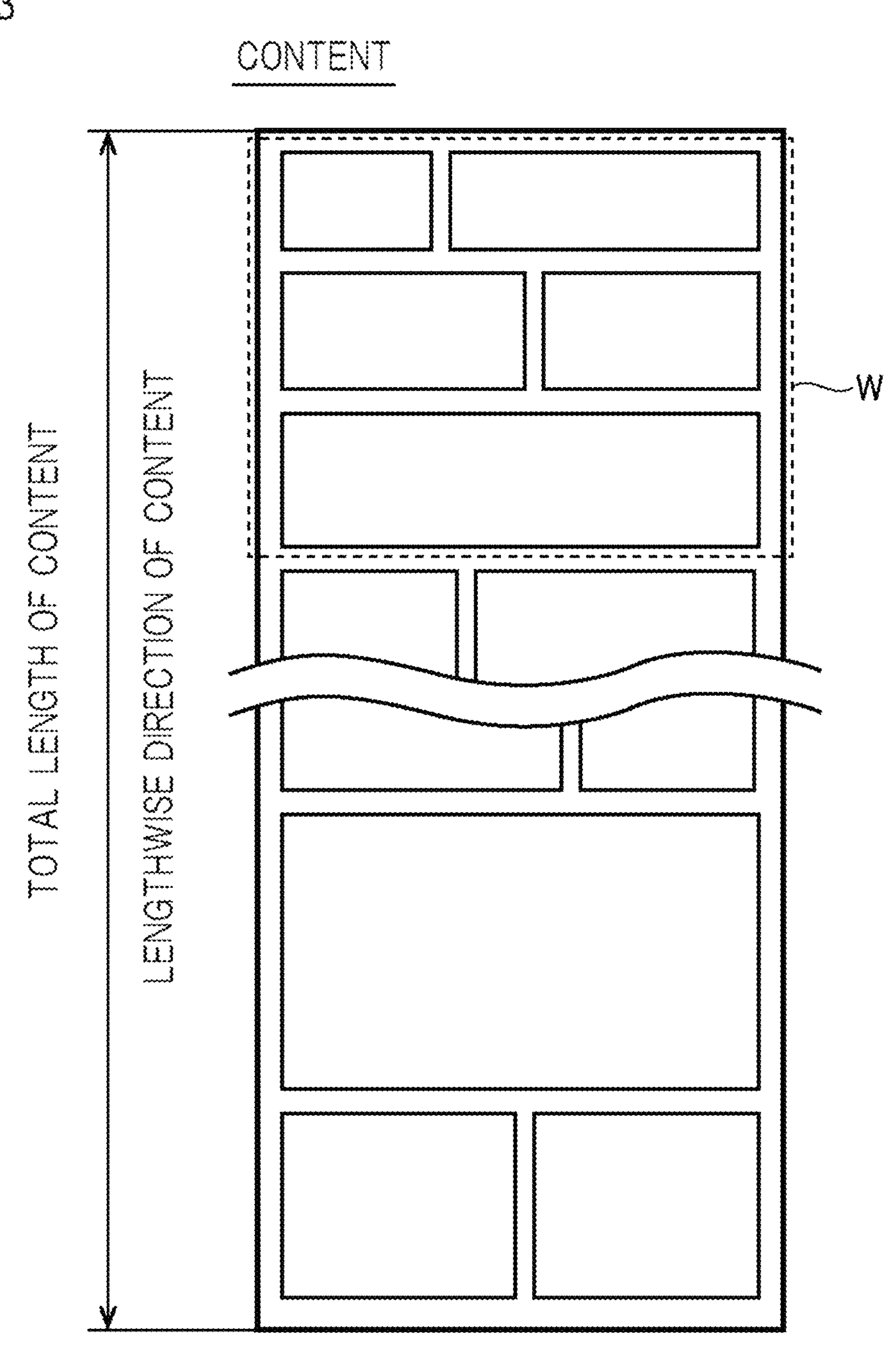
FIG. 3 serves to explain the configuration of vertical scrolling manga in this embodiment.

Vertical scrolling manga is like a single, vertically elongated image, as shown in FIG. 3. Note that a single, vertically elongated image such as the one shown in FIG. 3 may be constituted of a single image file, or a single, vertically elongated image such as the one shown in FIG. 3 may be constituted by joining together a plurality of image files.

The display control unit 11 displays content such as that shown in FIG. 3 part by part. The section enclosed by a frame W in FIG. 3 is the part displayed on the display. Furthermore, the display control unit 11 switches the part of content displayed on the display by moving the displayed part either in the first direction or the second direction according to user operations. The first direction is the direction for advancing the story, which is the downward direction in FIG. 3. The second direction is the direction for rewinding the story, which is the upward direction in FIG. 3. Note that the display control unit 11 does not perform processing for moving the part of content displayed on the display in directions other than the first direction and the second direction described above.

Figure 4:
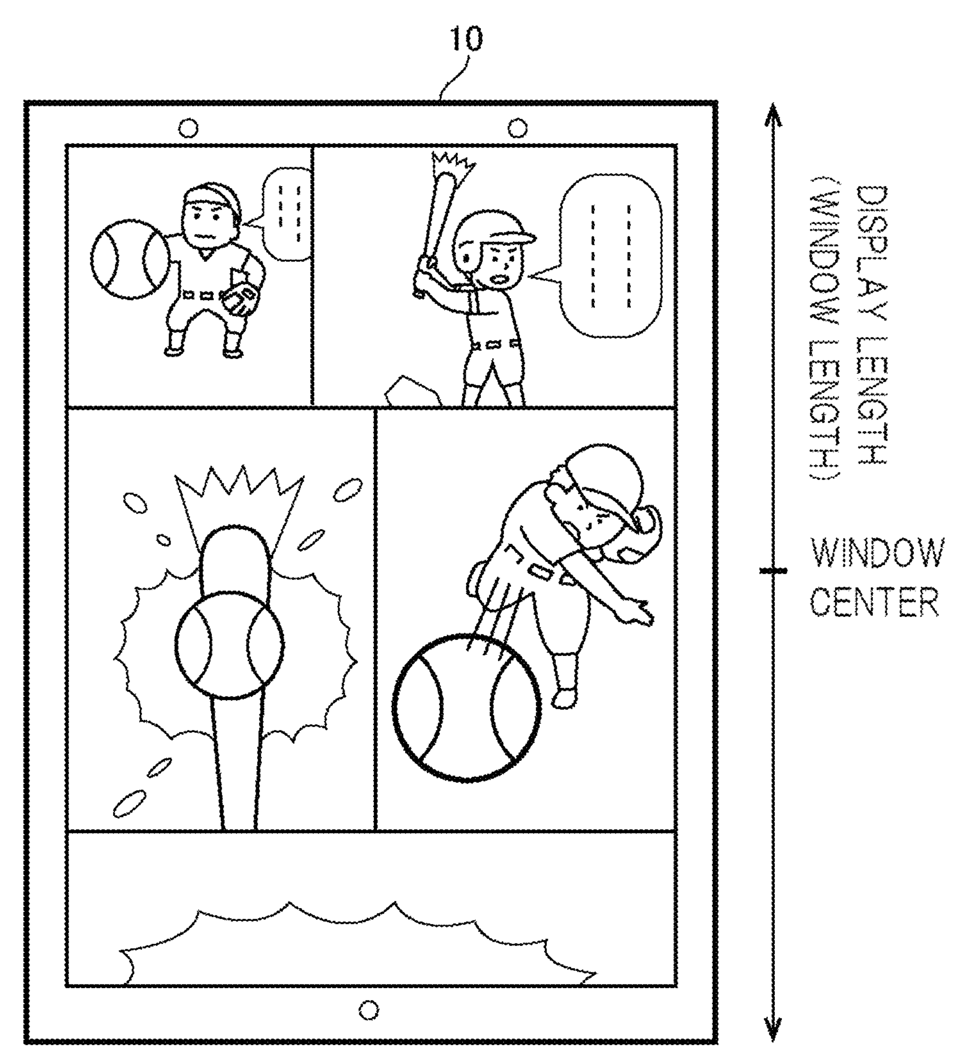
FIG. 4 shows an example of how a part of content is displayed on a display in this embodiment.

FIG. 4 shows how a part of content is displayed on the display of the user terminal 10. For example, the user terminal 10 receives content from a content providing server that provides the content. The server 20 described above may be the content providing server. Furthermore, the display control unit 11 processes the content received from the content providing server and displays the processed content on the display of the user terminal 10, as shown in FIG. 4.

After displaying the content, the display control unit 11 accepts a user operation for switching the content display position via an input device of the user terminal 10. Then, the display control unit 11 switches the part of content displayed on the display according to the user operation by moving the displayed part either in the first direction or the second direction. Examples of the input device include, but are not limited to, a touch panel, a physical button, a microphone, a keyboard, and a mouse. The display control unit 11 accepts inputs for moving the displayed section in the first direction and inputs for moving the displayed section in the second direction via these kinds of input devices.

Figure 5:
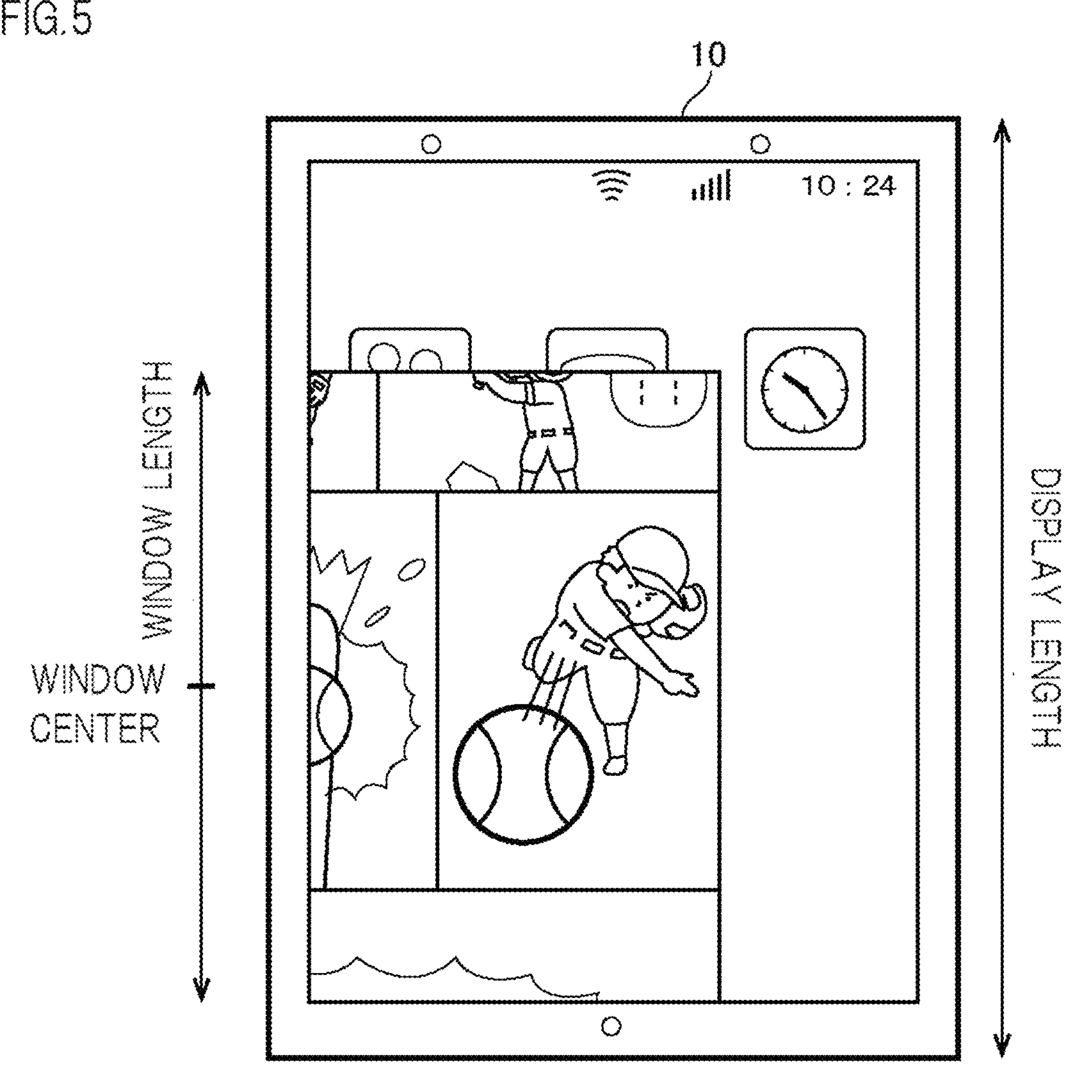
FIG. 5 shows an example of how a part of content is displayed on a display in this embodiment.

Note that content is displayed on the entire display in some cases, as shown in FIG. 4, and content is displayed on a part of the display in other cases, as shown in FIG. 5.

In this embodiment, the length of the display in the first direction and the second direction described above (i.e., the direction in which content is scrolled) is referred to as the "display length". Furthermore, the length of a window in which content is displayed in the first direction and the second direction described above (i.e., the directions in which content is scrolled) is referred to as the "window length". Furthermore, the center of the window in which content is displayed along the lengthwise direction of the window is referred to as the "window center". The display length and the window length are different concepts.

Referring back to FIG. 2, the recording unit 12 records display position information with a timestamp in log data, the display position information indicating the part of content displayed on the display of the user terminal 10.

As described earlier, the display control unit 11 displays content on the display part by part. Furthermore, the display control unit 11 switches the part of content displayed on the display according to user operations. The display position information indicates which section of content (which part of content) was displayed on the display at each timing.

The display position information indicates the part of content displayed on the display in terms of a value with respect to the beginning of the content. The value may be a serial number of a pixel among pixels arrayed along the lengthwise direction of the content (see FIG. 3) (a value indicating the number of rows as counted from the top row). Alternatively, the value may be a serial number of a frame among frames arrayed along the lengthwise direction of the content (see FIG. 3) (a value indicating the number of rows as counted from the top row). For example, the serial number of a pixel or frame located at the window center may be recorded as the display position information, or the serial number of a pixel or frame located at another prescribed position in the window may be recorded as the display position information.

In this embodiment, it is assumed that the timestamp indicates date and time information. As a modification, the timestamp may indicate the time elapsed since the timing when the viewing of the content was started. The timing at which the viewing of content was started is, for example, the timing at which the content was displayed on the user terminal 10; alternatively, however, another timing may be defined as the timing at which viewing was started.

Furthermore, the recording unit 12 may further record a size value with a timestamp in the log data, the size value indicating the size of the part of content displayed on the display. The size of the part of content displayed on the display is the length of the part of content displayed on the display (the length along the lengthwise direction of the content). Hereinafter, the value indicating the size (length) of the part of content displayed on the display will be referred to as displayed part information. The displayed part information is given, for example, in terms of the number of pixels.

The size (length) of the part of content displayed on the display is switched according to switching of the size of the window in which the content is displayed, enlargement/reduction of the content displayed in the window, etc. The size (length) of the part of content decreases as the window becomes smaller, and the size (length) of the part of content displayed in the window increases as the window becomes larger. Furthermore, the size (length) of the part of content displayed in the window decreases as the content displayed in the window is enlarged, and the size (length) of the part of content displayed in the window increases as the content displayed in the window is reduced. The displayed part information indicates the size of the part of content displayed on the display at each timing.

FIG. 6 schematically shows an example of log data recorded by the recording unit 12. In the example shown, combinations of display position information, displayed part information, and timestamps are registered in association with content identification information of the content viewed. The recording unit 12 causes the storage unit 13 to store such log data.

Referring back to FIG. 2, the normalization unit 14 performs the following normalization processing on the abovementioned log data stored in the storage unit 13.

(Processing 1) "The time elapsed since the start of viewing", indicated by the log data, is normalized by the total time of viewing the content displayed on the display.

(Processing 2) "The value indicating the part displayed on the display", indicated by the log data, is normalized by the total length information of the content.

The normalization unit 14 can further perform the following normalization processing in addition to the abovementioned processing 1 and 2.

(Processing 3) "The value indicating the size of the part displayed on the display", indicated by the log data, is normalized by the total length information of the content.

Processing 1 will be described. In processing 1, the normalization unit 14 normalizes "the time elapsed since the start of viewing" by dividing "the time elapsed since the start of viewing" by "the total time of viewing the content displayed on the display" and multiplying the result of the division by a first reference value n1.

The total time is the time taken to finish reading content, which may vary among individual users and among individual occasions of viewing. The total time is calculated on the basis of log data. Which timing in the log data is to be defined as the timing of the start of viewing and which timing in the log data is to be defined as the timing of the end of viewing are design matters. The computation for dividing "the time elapsed since the start of viewing" by "the total time of viewing the content displayed on the display" means the calculation of the ratio of "the time elapsed" to "the total time". With this normalization processing, "the time elapsed since the start of viewing" in any occasion of content viewing by any user is expressed by a value in the range of 0 to n1.

n1 defines the resolution from the start of viewing to the end of viewing. For example, the value of n1 may be approximately 100,000. A specific example will be described. If the total time is three minutes (=180,000 milliseconds) and n1=100,000, one unit time is 1.8 milliseconds (=180,000/100,000). In this case, for example, the timing at which two minutes has elapsed since the start of viewing is expressed as 66,667 (=2×100,000/3).

Next, processing 2 will be described. In processing 2, the normalization unit 14 normalizes "the value indicating the part displayed on the display" by dividing "the value indicating the part displayed on the display", indicated by the display position information, by "the value indicating the total length of the content", indicated by the total length information of the content, and multiplies the result of the division by a second reference value n2. The computation for dividing "the value indicating the part displayed on the display" by "the value indicating the total length of the content" means the calculation of the ratio of "the length from the beginning of the content to the part displayed on the display" to "the total length of the content". With this normalization processing, "the value indicating the part displayed on the display" in any occasion of content viewing by any user is expressed by a value in the range of 0 to n2. Note that "the value indicating the part displayed on the display" indicates the display position of the content, i.e., the position at which the user is viewing.

n2 defines the resolution of the display position of the content. For example, the value of n2 may be approximately 100,000. Note that the value of n2 should preferably be the same as the value of n1 but may differ from the value of n1. A specific example will be described. First, an example in the case where the display position of the content is expressed by the serial number of a pixel will be described. For example, in the case where the display position of the content is the pixel on the 500th row and the content is constituted of 50,000 rows of pixels, the display position thereof is expressed as 1,000 (=500×100,000/50,000). Next, an example in which the display position of the content is expressed by the serial number of a frame will be described. For example, in the case where the display position of the content is the frame on the 10th row and the content is constituted of fifty rows of frames, the display position thereof is expressed as 20,000 (=10×100,000/50).

Next, processing 3 will be described. In processing 3, the normalization unit 14 normalizes "the value indicating the size of the part displayed on the display" by dividing "the value indicating the size of the part displayed on the display", indicated by the displayed part information, by "the value indicating the total length of the content", indicated by the total length information of the content, and multiplying the result of the division by a third reference value n3. The computation for dividing "the value indicating the size of the part displayed on the display" by "the value indicating the total length of the content" means the calculation of the ratio of "the length of the part displayed on the display" to "the total length of the content". With this normalization processing, "the size of the part of content displayed on the display" in any occasion of content viewing by any user is expressed by a value in the range of 0 to n3.

n3 defines the resolution of the size of the part of content displayed on the display. For example, the value of n3 may be approximately 100,000. Note that the value of n3 should preferably be the same as the values of n1 and n2 but may differ from the values of n1 and n2. A specific example will be described. First, in the case where the size of the part of content displayed on the display (the number of pixels along the lengthwise direction of the content) is 100 pixels and the content is constituted of 50,000 rows of pixels, the size of the part of content displayed on the display is expressed as 200 (=100×100,000/50,000).

FIG. 7 shows data obtained by normalizing the log data in FIG. 6. In the normalized log data shown in FIG. 7, for each elapsed time since the start of viewing, normalized display position information and displayed part information are recorded.

Referring back to FIG. 2, the transmission unit 15 transmits the log data that has been subjected to the normalization processing to an external device. For example, the external device is the server 20.

Figure 8:
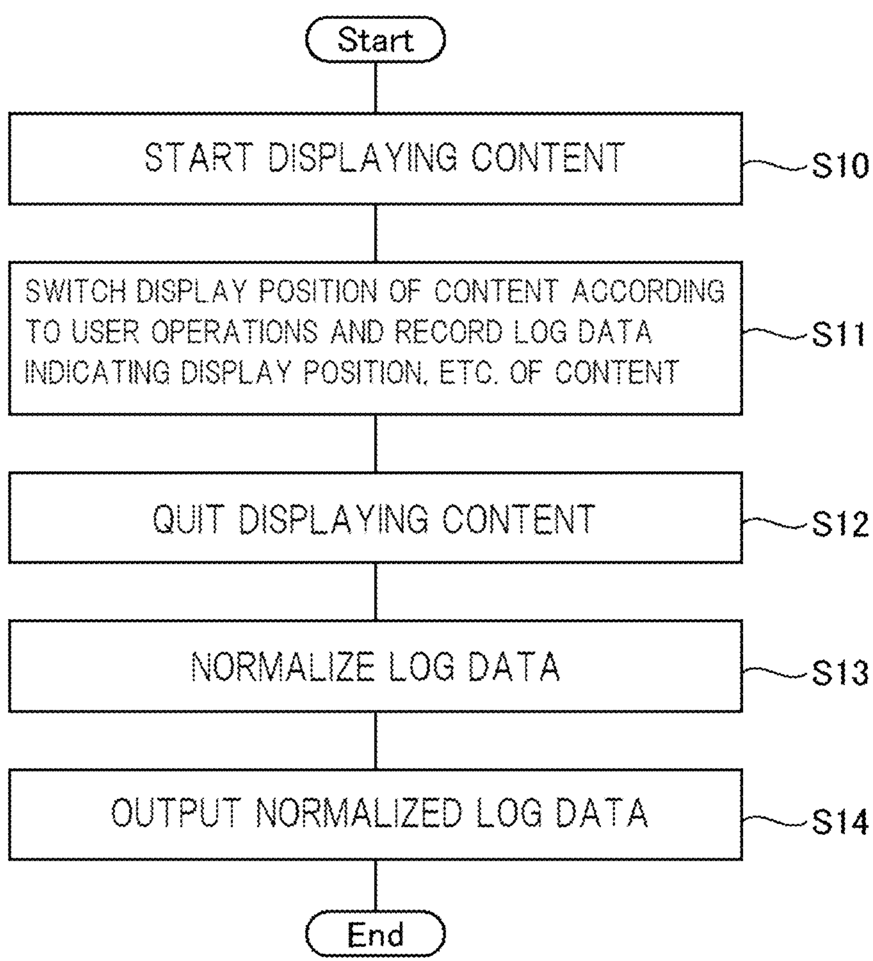
FIG. 8 is a flowchart showing an example flow of processing by the user terminal in this embodiment.

Next, an example flow of processing by the user terminal 10 will be described with reference to a flowchart in FIG. 8.

The user terminal 10 starts displaying a part of content on the display according to a user operation (S10), and then switches the part of content displayed on the display by moving the displayed part either in the first direction or the second direction according to user operations, while also starting the recording of log data (S11). In the log data, display position information indicating the part of content displayed on the display is recorded with a timestamp. Furthermore, in the log data, displayed part information indicating the size of the part of content displayed on the display may be recorded with a timestamp. The user terminal 10 performs the processing in S11 while content is displayed on the display.

Then, the user terminal 10 quits displaying the part of content on the display according to a user operation (S12), and then performs processing for normalizing the log data recorded in the processing in S11 (S13). The details of the normalization processing have been described above and thus will not be described here.

Then, the user terminal 10 transmits the log data that has been subjected to the normalization processing to an external device such as the server 20.

<Server 20>

Figure 9:
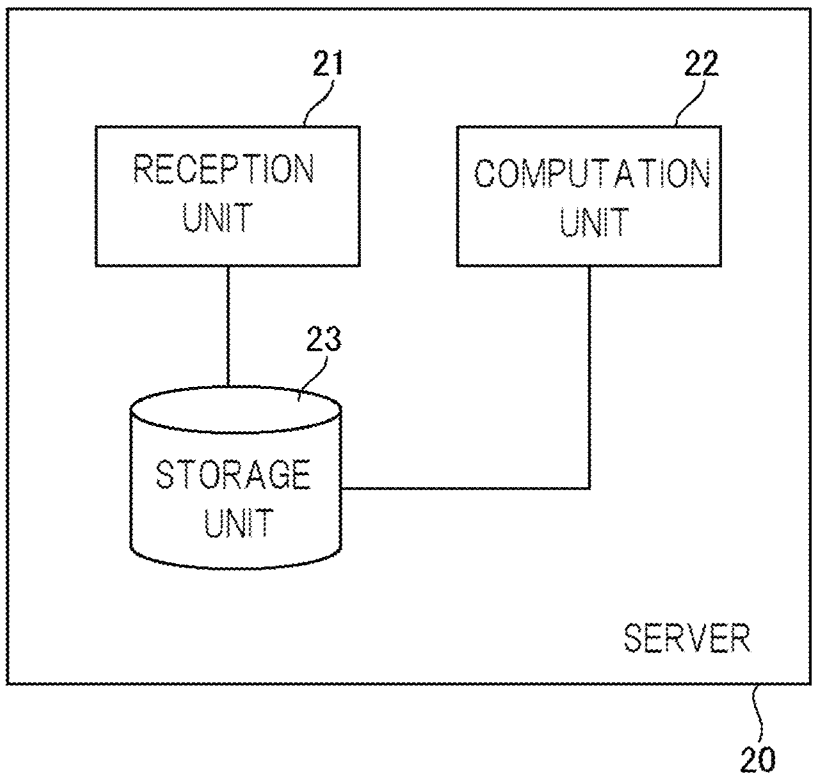
FIG. 9 shows an example functional block diagram of the server in this embodiment.

FIG. 9 shows an example functional block diagram of the server 20. As shown in the figure, the server 20 includes a reception unit 21, a computation unit 22, and a storage unit 23. These functional units are realized by installing a prescribed application (program) in the server 20.

The reception unit 21 receives log data that has been subjected to normalization processing from user terminals 10. The reception unit 21 can receive log data that has been subjected to normalization processing from a plurality of user terminals 10 in association with user identification information of users who operate the individual user terminals 10. The reception unit 21 causes the storage unit 23 to store the data received.

The computation unit 22 performs computational processing on the log data that has been subjected to normalization processing and received by the reception unit 21.

For example, the computation unit 22 may statistically process log data that has been subjected to normalization processing for a plurality of users for each item of content to calculate viewing tendencies of the plurality of users for that item of content. Alternatively, the computation unit 22 may statistically process log data that has been subjected to normalization processing for each user to calculate viewing tendencies of that user.

For example, the computation unit 22 may create data indicating tendencies concerning corresponding relationships between the time elapsed since the start of viewing and the display position (viewing position).

Furthermore, the computation unit 22 may calculate a viewing score indicating the degree of having been viewed for each prescribed unit in the content. Examples of the prescribed unit includes a pixel, a frame, a page, and a character. The computation unit 22 may calculate a viewing score for each prescribed unit according to the criterion that the viewing score "becomes higher as the prescribed unit is displayed for a longer period in a place nearer to the center of the window".

Furthermore, the computation unit 22 may extract and output prescribed units having viewing scores greater than or equal to a reference value. It is highly probable that the sections having viewing scores greater than or equal to the reference value are sections that users wish to read repeatedly and carefully, sections that are difficult and hard to understand, sections where popular characters appear, etc. Improvements in content can be expected by extracting such characteristic sections and, for example, feeding back the results to the authors.

Furthermore, the computation unit 22 may visualize the results of calculating viewing scores on the content in the form of a heat map or may display the results of calculating viewing scores in the form of rankings (a plurality of prescribed units are displayed as arranged in order of the viewing scores thereof).

Log data indicating viewing actions for individual items of content by individual users have been subjected to normalization processing, as described earlier. This makes it possible to readily compare log data among a plurality of items of content, to readily collectively analyze log data associated with a plurality of users, etc. Furthermore, by utilizing display position information and displayed part information in combination with each other, it is possible to identify which part of content was actually displayed on the display.

Furthermore, the computation unit 22 may detect other users having viewing tendencies similar to those of a user who is subject to processing and may determine that content viewed by the other users in the past is to be recommended to the user who is subject to processing.

Note that other specific examples of computational processing by the computation unit 22 will be described in later examples.

Figure 10:
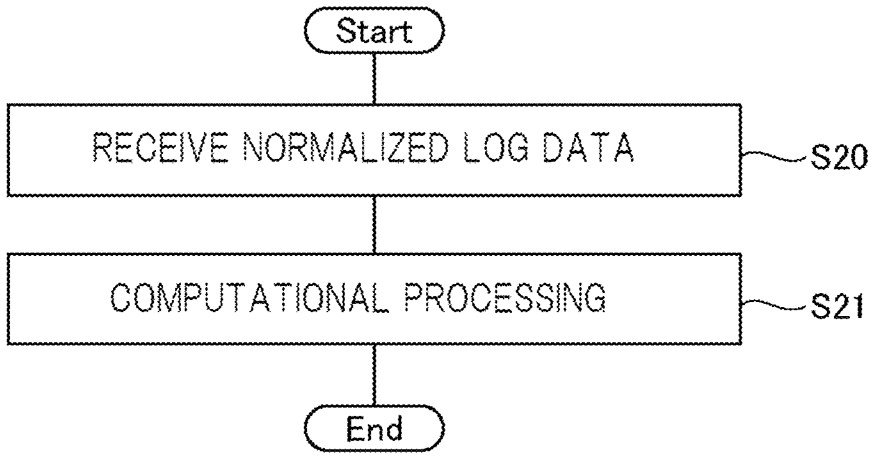
FIG. 10 is a flowchart showing an example flow of processing by the server in this embodiment.

Next, an example flow of processing by the server 20 will be described with reference to a flowchart in FIG. 10.

The server 20 receives log data that has been subjected to normalization processing from each of a plurality of user terminals 10 and causes the storage unit 23 to store the log data. Then, the server 10 performs computational processing, at an arbitrary timing, on the log data that has been subjected to normalization processing and stored in the storage unit 23.

"Hardware Configuration"

Next, the hardware configurations of the user terminal 10 and the server 20 will be described. Each of the functional units included in the user terminal 10 and the server 20 in this embodiment is realized by an arbitrary combination of hardware and software mainly including a central processing unit (CPU) of an arbitrary computer, a memory, programs that are loaded into the memory, a storage unit such as a hard disk that stores the programs (which can store not only programs that are stored in advance at the stage of shipping the device but also programs stored in storage media such as compact discs (CDs) or downloaded from a server or the like on the Internet), and a network connection interface. Furthermore, it would be understood by a person skilled in the art that there are various modifications concerning the method and device for realizing each of the functional units.

Figure 11:
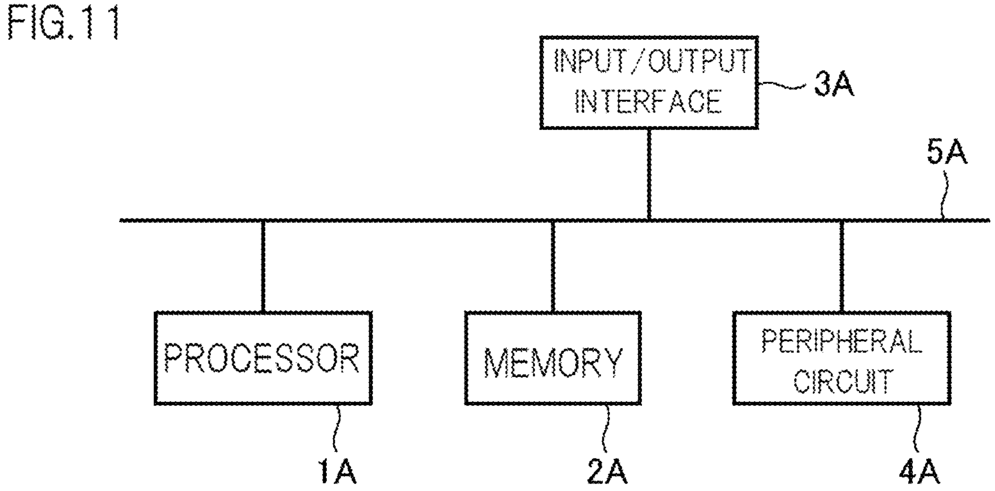
FIG. 11 shows an example hardware configuration of a device in this embodiment.

FIG. 11 is a block diagram showing an example hardware configuration of each of the user terminal 10 and the server 20. As shown in FIG. 11, each of the user terminal 10 and the server 20 includes a processor 1A, a memory 2A, an input/output interface 3A, a peripheral circuit 4A, and a bus 5A. The peripheral circuit 4A includes various modules. Note that each of these devices need not include the peripheral circuit 4A.

Note that each of the user terminal 10 and the server 20 may be constituted of a plurality of physically and/or logically separated devices. In this case, each of these devices may include the hardware configuration described above. Alternatively, each of the user terminal 10 and the server 20 may be constituted of a physically and logically single device.

The bus 5A is a data transmission path that allows the processor 1A, the memory 2A, the peripheral circuit 4A, and the input/output interface 3A to send data to and receive data from each other. The processor 1A is a computational processing device, such as a CPU or a graphics processing unit (GPU). The memory 2A is a memory, such as a random access memory (RAM) or a read only memory (ROM). The input/output interface 3A includes interfaces for acquiring information from input devices, external devices, external servers, external sensors, etc., interfaces for outputting information to output devices, external devices, external servers, etc., and so forth. Examples of the input devices include a keyboard, a mouse, and a microphone. Examples of the output devices include a display, a speaker, a printer, and a mailer. The processor 1A can issue instructions to the individual modules and can perform computations on the basis of the results of computations by the individual modules.

EXAMPLE

Next, an example in which the system in the embodiment described above is embodied more specifically will be described.

Figure 12:
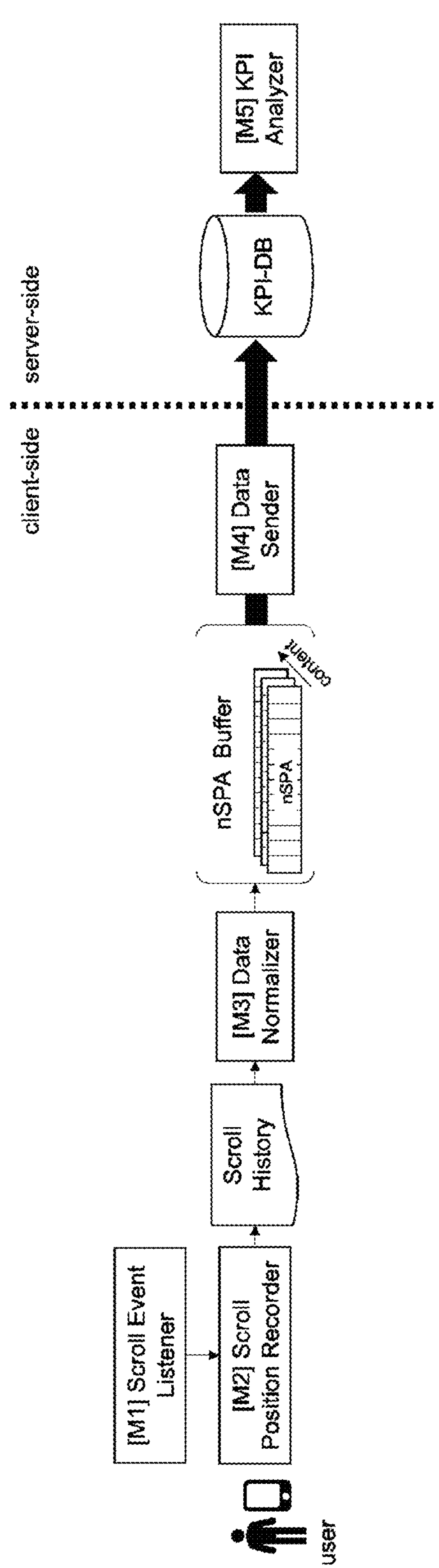
FIG. 12 shows the configuration of an example of this embodiment.

FIG. 12 shows the configuration of this example. "client-side" in FIG. 12 is realized by the user terminal 10. "server-side" in FIG. 12 is realized by the server 20. On the client side in this example, while vertical scrolling manga is displayed, the current scrolling position is periodically detected, and coordinate information indicating the position is recorded in a normalized form. At this time, in this example, the normalization described earlier is performed while considering viewing speeds, which vary among individual users, content lengths, which vary among individual items of content, sizes of parts of content displayed on displays, which vary depending on device characteristics and the manners of viewing by users, etc.

<Data Structures>

The following three data structures constitute this example: a variable n, which serves as a resolution when the proposed system normalizes time and space; an array S, which stores a model of scroll histories normalized by the variable n; and a variable R, which indicates the number of pixels that can be displayed on the screen along a coordinate axis normalized by n similarly to S.

The variable n is a "resolution" for normalizing both a position displayed on a display in vertical scrolling manga and the time elapsed since the start of viewing. For example, about n=100,000 is a preferable implementation. This means, for example, normalizing the vertical number of pixels in one episode of vertical scrolling manga with 100,000 pixels as the maximum value along the vertical direction. That is, in the case where one episode of vertical scrolling manga is physically constituted of 50,000 pixels, the amount of scrolling corresponding to one physical pixel is expressed as two (=100,000/50,000) unit distances in terms of the amount of scrolling normalized by n=100,000.

As described above, in this example, all scrolling operations are converted into models indicating positional changes along the normalized coordinate axis. Furthermore, when the time taken to finish reading vertical scrolling manga was three minutes (=180,000 milliseconds), the time is converted into a model in which one second corresponds to 555 (=100,000/180) unit times in terms of the elapsed time normalized by n=100,000. As described above, both time and space are normalized by a suitably high resolution, which makes it possible to compare and aggregate viewing histories of different users, different user terminals 10, and different items of content.

Note that it is possible to perform analysis in which equal importance is placed on time and space by using the same value (n) as a resolution for both time and space. When independent resolutions are adopted for time and space with the temporal resolution being greater than the spatial resolution, it becomes possible to calculate a KPI with which greater importance is placed on features along the temporal axis. However, in order to perform distance calculation that is intuitive to the analyzer, it is preferable to use the same value (n) as a resolution for both time and space.

The array S is array data that normalizes scrolling histories, making it possible to compare scrolling histories among different users and among different items of content. This array data will be referred to as normalized Scroll Position Array (nSPA). nSPA can be expressed as a model in the form of an n-dimensional dense array, as expressed in formula (1).

[Formula 1]

$$S=[t_0, t_1, t_2, \ldots , t_{n-1}] \tag{1}$$

The value t of each element in the array is a value along a spatial axis normalized by n, and is expressed by a coordinate value such that 0 indicates the first pixel along the Y axis (the lengthwise axis of the content, see FIG. 3) and n indicates the last pixel along the Y axis of vertical scrolling manga. n is a value of the time elapsed since the start of viewing vertical scrolling manga, normalized by the total time taken to finish reading. For example, the value of t10 indicates the pixel displayed at the window center in the 10th unit time. Note that the reason for using the window center as a reference is to simplify calculation, and other coordinates in the window may be used as reference points.

Figure 13:
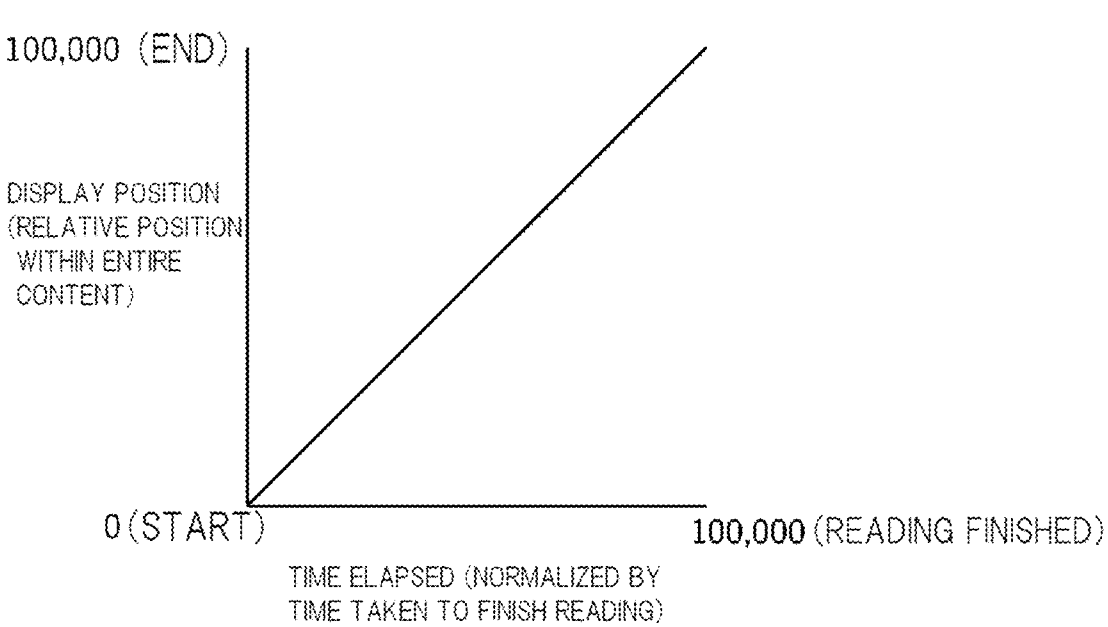
FIG. 13 shows an example of information that is processed in an example of this embodiment.
Figure 14:
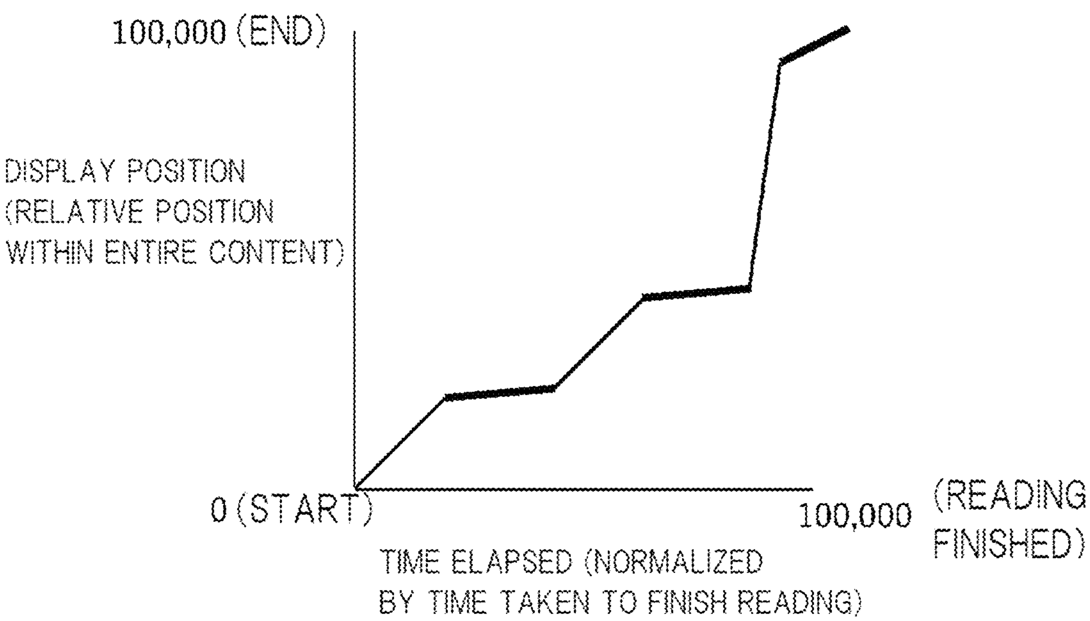
FIG. 14 shows an example of information that is processed in an example of this embodiment.
Figure 15:
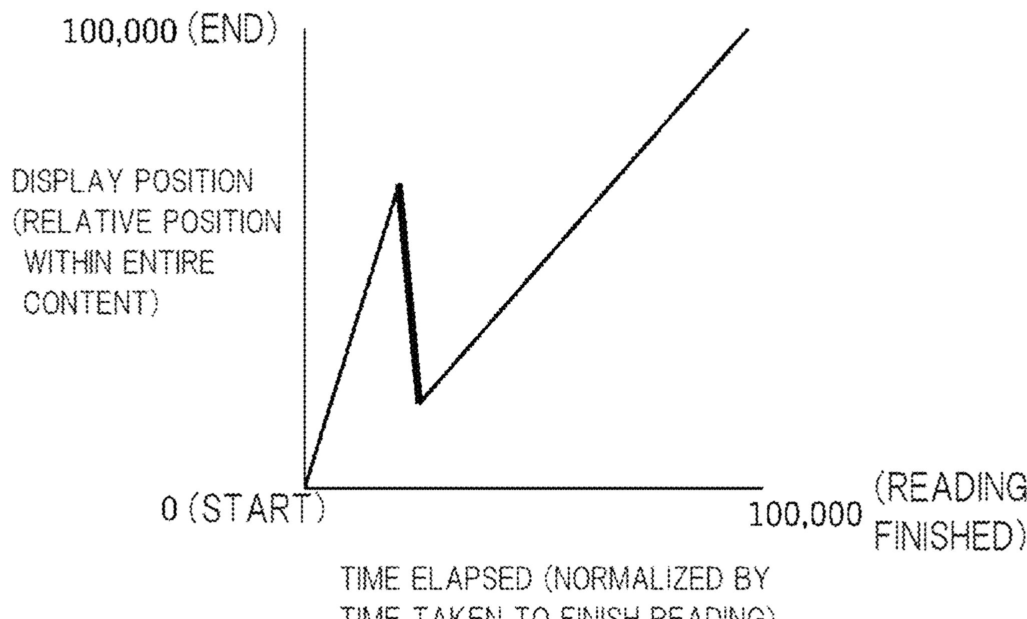
FIG. 15 shows an example of information that is processed in an example of this embodiment.

Now, FIGS. 13 to 15 show visualizations (graph representations) of the array S. The horizontal axis indicates n, i.e., the value of the time elapsed since the start of viewing vertical scrolling manga, normalized by the total time taken to finish reading. The vertical axis indicates t, i.e., the value of the pixel displayed at the window center at each timing, normalized by the total length of the content.

Switching the position displayed on the screen by mechanical scrolling at a constant speed results in a linear graph such as the one shown in FIG. 13. Carefully reading a part of vertical scrolling manga while spending substantial time results in a graph such as the one shown in FIG. 14. As shown in the figure, the slope is gentle in a time range in which substantial time was spent for careful reading. Furthermore, in the case where a user read a part again by rewinding, a time range having a negative slope appears, as shown in FIG. 15. This time range is a time range including rewinding. Furthermore, it is indicated that rewinding to the display position having the minimal value occurred. As described above, features corresponding to characteristic actions of viewing vertical scrolling manga appear in graphs. By detecting such features, it is possible to detect characteristic viewing actions by users. Furthermore, by creating graphs as shown in the figures, it is possible to intuitively recognize tendencies of viewing by users. Note that graphs may be created on a per-user basis, or the results of statistically processing arrays S of a plurality of users for a single item of content may be represented in the form of graphs.

The array R is an array of numerical values r indicating the size (the number of pixels) of the part of content displayed on the display along the normalized coordinate axis described above, which varies depending on device characteristics and the manner of display by the user. The variables r make it possible to identify the part of content displayed in the window. For example, in the case where the variable tn described above indicates the pixel located at the window center in the n-th unit time, it is understood that the range of pixels from (tn−rn/2) to tn+rn/2) were displayed in the window. Considering that the window size is changed dynamically, R is defined as in formula (2) in this example.

[Formula 2]

$$R = [r_0, r_1, r_2, \ldots, r_{n-1}] \tag{2}$$

Here, since n corresponds to the temporal resolution, by combining the array S and the array R, it is possible to readily identify the content displayed in the window.

<KPI Analysis Method>

An example KPI analysis method in this example will be described. A function PwCV(p,S,R) for calculating the pixel-wise content views (PwCVs) of a specific pixel p in one episode of vertical scrolling manga is expressed as formula (3).

[Formula 3]

$$PwCV(p, S, R) = \sum_{i=0}^{n} \text{center}(S_i, R_i, p) \tag{3}$$

Here, center(Si,Ri,p) is a function for applying a weight depending on the proximity of the displayed pixel p to the center in the window. The weight is 0 when the pixel p is not displayed in the screen. It is expected that weights for content views can be applied suitably in accordance with the reality, for example, by shifting the center function slightly upward from the center. For example, center(Si,Ri,p) may be implemented as in formula (4).

[Formula 4]

$$\text{center}(S_i, R_i, p) = \frac{1}{\sqrt{2\pi\sigma^2}} e^{-\frac{(p-\mu)^2}{2\sigma^2}} \left(S_i - \frac{R_i}{2} < p < S_i + \frac{R_i}{2}\right) \tag{4}$$

Figure 16:
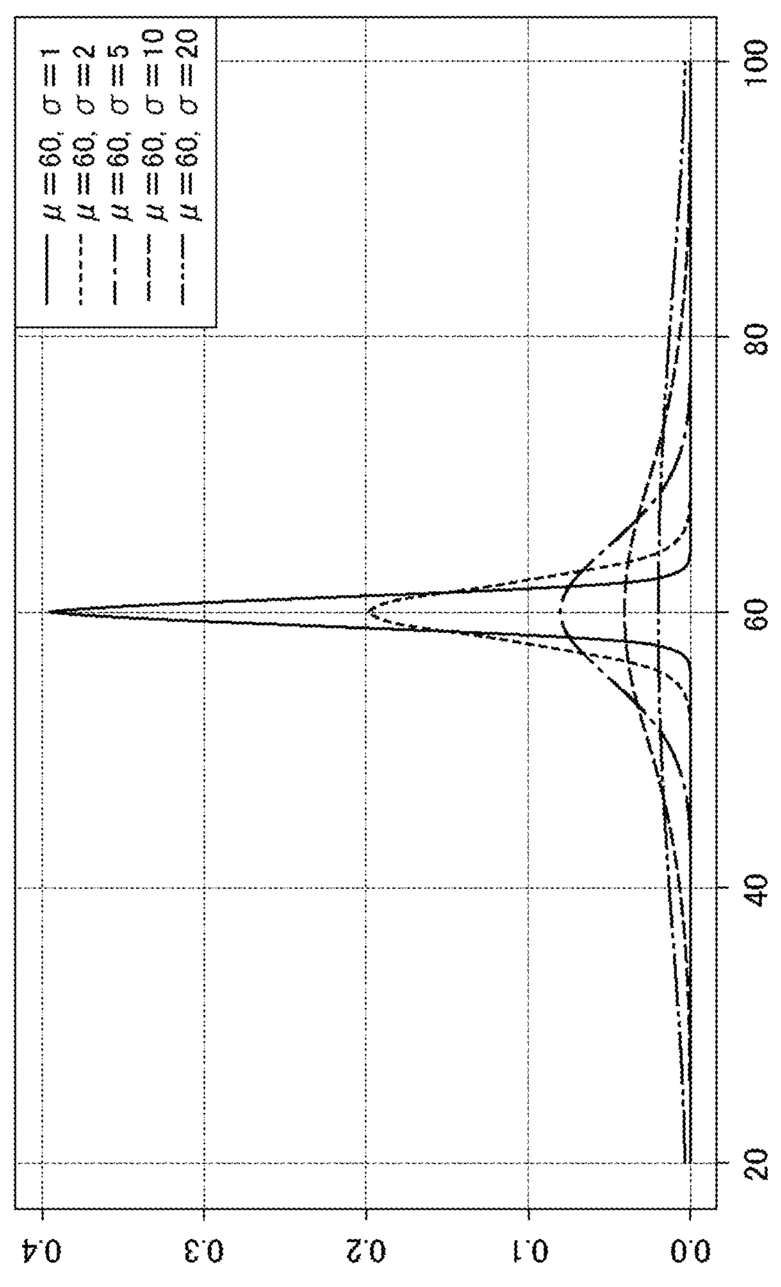
FIG. 16 shows an example of information that is processed in an example of this embodiment.

Here, μ signifies the coordinate of the pixel at the center of the screen, and σ signifies the standard deviation of weights. As shown in FIG. 16, as σ increases, the mountain of the distribution becomes gentler, which inhibits weighting for a specific coordinate. It is possible to set suitable values of u and o on the basis of such a relationship.

Figure 17:
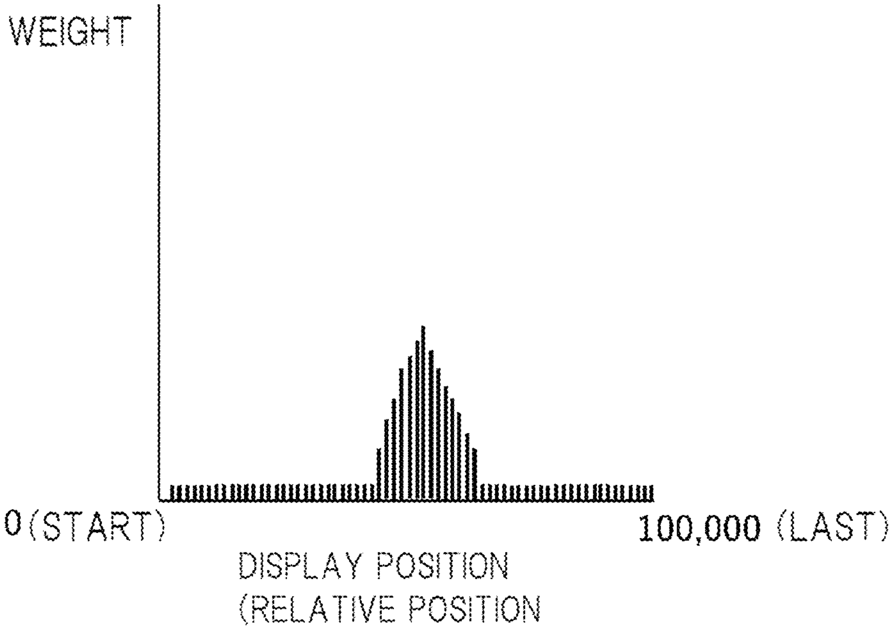
FIG. 17 shows an example of information that is processed in an example of this embodiment.
Figure 18:
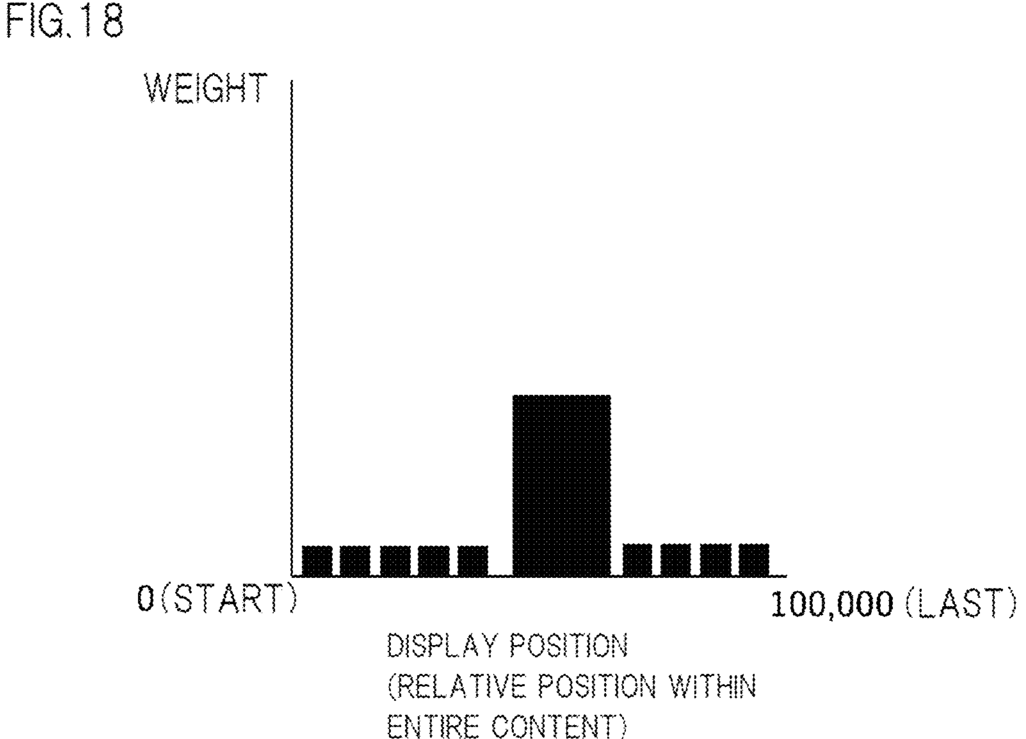
FIG. 18 shows an example of information that is processed in an example of this embodiment.

PwCV(p,S,R) calculated in the manner described above can be expressed as a histogram of the viewing scores (content views) of the individual pixels arrayed along the lengthwise direction of the content (the individual rows), as shown in FIG. 17. Alternatively, PwCV(p,S,R) may be expressed as a histogram of the viewing scores (content views) of the individual frames arrayed along the lengthwise direction of the content (the individual rows), as shown in FIG. 18. Alternatively, PwCV(p,S,R) may be expressed as a histogram of the viewing scores (content views) of individual pages or individual characters. It is possible to calculate viewing scores for individual pages, individual frames, or individual characters from data indicating content views of the individual pixels, such as the data shown in FIG. 17, on the basis of information indicating the pixels corresponding to each page, the pixels corresponding to each frame, the character displayed at each pixel, etc.

<Module Set>

Next, five functional modules shown in FIG. 12 will be described.

[M1] Scroll Event Listener is a module that hooks scroll processing and that is called each time the user scrolls the screen. With ordinary smartphone operating systems (OSs) or web browsers or with OSes for PCs, since it is possible to issue an event each time the screen is scrolled, it is possible to readily implement this module.

[M2] Scroll Position Recorder is a module that records the part of content currently displayed on the display, together with a timestamp. Scroll History, which is recorded by this module, stores a sequence of pairs of <timestamp, position> indicating positions after scrolling as histories.

[M3] Data Normalizer performs normalization processing in accordance with a prescribed temporal resolution and a prescribed spatial resolution, while considering viewing speeds, which vary among individual users, content lengths, which vary among individual items of content, and the sizes of the parts of content displayed on displays, which vary depending on device characteristics and the manners of viewing by users. The normalized data is stored in nSPA Buffer. The nSPA data structure has been described earlier.

[M4] Data Sender is a module that sends the data in nSPA Buffer to the server in the back ground of the app operation, for example, when reading is finished.

[M5] KPI Analyzer is a module that calculates a KPI by using the above-described function PwCV(p,S,R). Per-frame calculation or per-character calculation may be performed as superordinate analysis by using a score histogram calculated by PwCV(p,S,R). Note that nSPA that is stored in KPI DB should preferably be an anonymous file that is anonymized without being associated with user identifiers. This realizes protection of the privacy of users (readers).

"Operations and Advantages"

This embodiment is a method of calculating the pixel-wise content views by means of software alone. This method makes it possible for the first time to digitally extract a KPI for content such as manga, in which the proceeding of the story is controlled by each user, and a wide variety of applications thereof are conceivable. The greatest advantage of this embodiment consists in making it possible to measure the pixel-wise content views of vertical scrolling manga by means of software alone. This makes it possible to automatically calculate a KPI for manga, such as detecting frames that gave great impact, detecting parts in which the development of the story was hardly understandable, and detecting popular characters. Furthermore, it becomes possible to recommend content by using viewing histories of users with similar viewing actions. In addition to such content view analysis not requiring any hardware eye tracker, this embodiment also has the following advantages.

Versatility: This embodiment is applicable to a wide variety of content as long as an application that allows the user to freely control vertical scrolling is used. This embodiment makes it possible to calculate the pixel-wise content views in various places, such as websites or native apps.

Anonymity: With this embodiment, it is possible to save log data indicating content views in the form of normalized data and to statistically process the data while maintaining anonymity. Thus, the risk concerning privacy protection associated with KPI analysis is extremely low.

Scalability: According to this embodiment, appropriate normalization is possible as long as a certain amount of content units are available, as in the case of weekly or monthly serial manga or a manga book. Thus, it is possible to aggregate the viewing histories of a single item of content into data of about 400 KB at most. Furthermore, by adopting a mechanism for notifying a server when a user has finished reading an item of content, the number of times that a single user sends KPI data to the server is capped at the number of times of finishing reading, which serves to distribute loads suitably.

"Modifications"

The system 1 in this embodiment may be modified as follows.

<Modification 1>

The content may be content other than vertical scrolling manga. For example, the content may be horizontal scrolling manga. Horizontal scrolling manga is like a single, horizontally elongated image and is viewed while being scrolled in the horizontal direction. Furthermore, the content may be an electronic book other than manga, such as a novel, a magazine, or a reference book. Also in the case of these types of content, similar operations and advantages are realized through processing similar to that in the embodiment described above.

<Modification 2>

The server 20, instead of the user terminal 10, may include the normalization unit 14. In this case, the user terminal 10 transmits log data that has not been subjected to normalization processing to the server 20. Then, the server 20 performs normalization processing on the log data. Also in this modification, operations and advantages similar to those in the embodiment described above are realized.

<Modification 3>

The second reference value and the third reference value in the normalization processing may be a fixed value that is commonly applied to all items of content, instead of a value indicating the total length of content. In this case, substantially, normalization processing in which content lengths are considered, which vary among individual items of content, is not executed.

In this case, while it becomes difficult to compare measurement results among a plurality of items of content, it is possible to pay attention to a single item of content and to statistically process viewing actions of a plurality of users for that item of content. Accordingly, also in this modification, operations and advantages similar to those in the embodiment described above are realized.

Examples of reference modes are appended below.

1. A program for causing a computer to function as:

a display control means for displaying a part of content on a display and switching the part of content displayed on the display by moving the displayed part either in a first direction or a second direction according to a user operation;

a recording means for recording display position information together with a timestamp in log data, the display position information indicating the part of content displayed on the display;

a normalization means for performing normalization processing on the log data, in which the time elapsed since the start of viewing, indicated by the log data, is normalized by the total time of displaying the content on the display and viewing the content, and in which the display position information indicated by the log data is normalized by total length information of the content; and a transmission means for transmitting the log data subjected to the normalization processing to an external device.

2. A program according to 1, wherein:

the recording means further records a value indicating a size together with a timestamp in the log data, the size being the size of the part of content displayed on the display; and the normalization means further performs, as the normalization processing, processing for normalizing the value indicating the size of the part of content, indicated by the log data, by the total length information of the content.

3. A program according to 1 or 2, wherein:

in the display position information, the part of content displayed on the display is indicated by using a value with respect to the beginning of the content;

the normalization means normalizes the time elapsed, indicated by the log data, by dividing the time elapsed by the total time and multiplying the result of the division by a first reference value, and normalizes the display position information indicated by the log data by dividing the value with respect to the beginning of the content, indicated by the display position information, by a value indicating the total length of the content, indicated by the total length information of the content, and multiplying the result of the division by a second reference value; and the first reference value and the second reference value are the same value.

4. A server including:

a reception unit that receives log data subjected to normalization processing from a user terminal including a display control unit that displays a part of content on a display and that switches the part of content displayed on the display by moving the displayed part either in a first direction or a second direction according to a user operation, a recording unit that records display position information together with a timestamp in the log data, the display position information indicating the part of content displayed on the display, a normalization unit that performs the normalization processing on the log data, in which the time elapsed since the start of viewing, indicated by the log data, is normalized by the total time of displaying the content on the display and viewing the content, and in which the display position information indicated by the log data is normalized by total length information of the content, and a transmission unit that transmits the log data subjected to the normalization processing to an external device; and a computation unit that executes computational processing on the log data subjected to the normalization processing and received from the user terminal.

5. A server according to 4, wherein:

the computation unit creates data indicating tendencies in corresponding relationships between the time elapsed and the display position information by executing statistical processing on the log data subjected to the normalization processing and received from a plurality of user terminals.

6. A server according to 4, wherein:

the computation unit calculates a viewing score indicating the degree of having been viewed for each prescribed unit in the content, on the basis of the log data subjected to the normalization processing and received from the user terminal.

7. A system including:

a plurality of user terminals having installed therein a program according to any one of 1 to 3; and a server according to any one of 4 to 6.

8. A data processing method, wherein a computer executes:

a display control step of displaying a part of content on a display and switching the part of content displayed on the display by moving the displayed part either in a first direction or a second direction according to a user operation;

a recording step of recording display position information together with a timestamp in log data, the display position information indicating the part of content displayed on the display;

a normalization step of performing normalization processing on the log data, in which the time elapsed since the start of viewing, indicated by the log data, is normalized by the total time of displaying the content on the display and viewing the content, and in which the display position information indicated by the log data is normalized by total length information of the content; and a transmission step of transmitting the log data subjected to the normalization processing to an external device.

9. A data processing method, wherein a computer executes:

a reception step of receiving log data subjected to normalization processing from a user terminal including a display control unit that displays a part of content on a display and that switches the part of content displayed on the display by moving the displayed part either in a first direction or a second direction according to a user operation, a recording unit that records display position information together with a timestamp in the log data, the display position information indicating the part of content displayed on the display, a normalization unit that performs the normalization processing on the log data, in which the time elapsed since the start of viewing, indicated by the log data, is normalized by the total time of displaying the content on the display and viewing the content, and in which the display position information indicated by the log data is normalized by total length information of the content, and a transmission unit that transmits the log data subjected to the normalization processing to an external device; and a computation step of executing computational processing on the log data subjected to the normalization processing and received from the user terminal.

10. A program for causing a computer to function as:

a reception means for receiving log data subjected to normalization processing from a user terminal including a display control unit that displays a part of content on a display and that switches the part of content displayed on the display by moving the displayed part either in a first direction or a second direction according to a user operation, a recording unit that records display position information together with a timestamp in the log data, the display position information indicating the part of content displayed on the display, a normalization unit that performs the normalization processing on the log data, in which the time elapsed since the start of viewing, indicated by the log data, is normalized by the total time of displaying the content on the display and viewing the content, and in which the display position information indicated by the log data is normalized by total length information of the content, and a transmission unit that transmits the log data subjected to the normalization processing to an external device; and a computation means for executing computational processing on the log data subjected to the normalization processing and received from the user terminal.

This application claims the priority based on Japanese Patent Application 2021-149082 filed on 14 Sep. 2021, and the entire disclosure thereof is incorporated herein.

REFERENCE SIGNS LIST

1A Processor
2A Memory
3A Input/output interface
4A Peripheral circuit
5A Bus
1 System
10 User terminal
11 Display control unit
12 Recording unit
13 Storage unit
14 Normalization unit
15 Transmission unit
20 Server
21 Reception unit
22 Computation unit
23 Storage unit

What is claimed is:

1. A nontransitory computer readable medium comprising a first program that, when executed by a computer, is configured to perform a first method comprising:

displaying a part of content on a display and switching the part of content displayed on the display by moving the displayed part in a first direction or a second direction according to a user operation;

recording display position information together with a timestamp in log data, the display position information indicating the part of content displayed on the display;

performing normalization processing on the log data, in which the time elapsed since the start of viewing, indicated by the log data, is normalized by the total time of displaying the content on the display and viewing the content, and in which the display position information indicated by the log data is normalized by total length information of the content; and transmitting the log data subjected to the normalization processing to an external device.

2. The nontransitory computer readable medium according to claim 1, wherein the first method further comprises:

recording a value indicating a size together with a timestamp in the log data, the size being the size of the part of content displayed on the display; and performing as the normalization processing, processing for normalizing the value indicating the size of the part of content, indicated by the log data, by the total length information of the content.

3. The nontransitory computer readable medium according to claim 1, wherein in the display position information, the part of content displayed on the display is indicated by using a value with respect to the beginning of the content, wherein the first method further comprises:

normalizing the time elapsed, indicated by the log data, by dividing the time elapsed by the total time and multiplying the result of the division by a first reference value, and normalizing the display position information indicated by the log data by dividing the value with respect to the beginning of the content, indicated by the display position information, by a value indicating the total length of the content, indicated by the total length information of the content, and multiplying the result of the division by a second reference value, and wherein the first reference value and the second reference value are the same value.

4. A server comprising:

a reception unit that receives log data subjected to normalization processing from a user terminal including a display control unit that displays a part of content on a display and that switches the part of content displayed on the display by moving the displayed part in a first direction or a second direction according to a user operation, a recording unit that records display position information together with a timestamp in the log data, the display position information indicating the part of content displayed on the display, a normalization unit that performs the normalization processing on the log data, in which the time elapsed since the start of viewing, indicated by the log data, is normalized by the total time of displaying the content on the display and viewing the content, and in which the display position information indicated by the log data is normalized by total length information of the content, and a transmission unit that transmits the log data subjected to the normalization processing to an external device; and a computation unit that executes computational processing on the log data subjected to the normalization processing and received from the user terminal.

5. The server according to claim 4, wherein:

the computation unit creates data indicating tendencies in corresponding relationships between the time elapsed and the display position information by executing statistical processing on the log data subjected to the normalization processing and received from a plurality of user terminals.

6. The server according to claim 4, wherein:

the computation unit calculates a viewing score indicating the degree of having been viewed for each prescribed unit in the content, on the basis of the log data subjected to the normalization processing and received from the user terminal.

7. A system comprising:

a plurality of user terminals, wherein a respective user terminal among the plurality of user terminals comprises a nontransitory computer readable medium having installed therein the first program according to claim 1; and a server comprising:

a processor; and a memory connected to the processor, wherein the memory comprises a second program configured to perform a second method comprising:

receiving the log data subjected to the normalization processing from a user terminal among the plurality of user terminals that displays the part of content on the display and that switches the part of content displayed on the display by moving the displayed part in the first direction or the second direction according to the user operation, recording the display position information together with the timestamp in the log data, the display position information indicating the part of content displayed on the display, performing the normalization processing on the log data, in which the time elapsed since the start of viewing, indicated by the log data, is normalized by the total time of displaying the content on the display and viewing the content, and in which the display position information indicated by the log data is normalized by total length information of the content, and transmitting the log data subjected to the normalization processing to an external device; and executing the computational processing on the log data subjected to the normalization processing and received from the user terminal.

8. A data processing method comprising:

displaying, by a computer, a part of content on a display and switching the part of content displayed on the display by moving the displayed part in a first direction or a second direction according to a user operation;

recording, by the computer, display position information together with a timestamp in log data, the display position information indicating the part of content displayed on the display;

performing, by the computer, normalization processing on the log data, in which the time elapsed since the start of viewing, indicated by the log data, is normalized by the total time of displaying the content on the display and viewing the content, and in which the display position information indicated by the log data is normalized by total length information of the content; and transmitting, by the computer, the log data subjected to the normalization processing to an external device.

9. A data processing method comprising:

receiving, by a computer, log data subjected to normalization processing from a user terminal including a display control unit that displays a part of content on a display and that switches the part of content displayed on the display by moving the displayed part in a first direction or a second direction according to a user operation, a recording unit that records display position information together with a timestamp in the log data, the display position information indicating the part of content displayed on the display, a normalization unit that performs the normalization processing on the log data, in which the time elapsed since the start of viewing, indicated by the log data, is normalized by the total time of displaying the content on the display and viewing the content, and in which the display position information indicated by the log data is normalized by total length information of the content, and a transmission unit that transmits the log data subjected to the normalization processing to an external device; and executing, by the computer, computational processing on the log data subjected to the normalization processing and received from the user terminal.

10. A nontransitory computer readable medium comprising a program that, when executed by a computer, is configured to perform a method comprising:

receiving log data subjected to normalization processing from a user terminal including a display control unit that displays a part of content on a display and that switches the part of content displayed on the display by moving the displayed part in a first direction or a second direction according to a user operation, a recording unit that records display position information together with a timestamp in the log data, the display position information indicating the part of content displayed on the display, a normalization unit that performs the normalization processing on the log data, in which the time elapsed since the start of viewing, indicated by the log data, is normalized by the total time of displaying the content on the display and viewing the content, and in which the display position information indicated by the log data is normalized by total length information of the content, and a transmission unit that transmits the log data subjected to the normalization processing to an external device; and executing computational processing on the log data subjected to the normalization processing and received from the user terminal.

* * * * *